(12) United States Patent
Becker et al.

(10) Patent No.: US 11,213,086 B2
(45) Date of Patent: Jan. 4, 2022

(54) PROTECTIVE HELMET

(71) Applicant: Schuberth GmbH, Magdeburg (DE)

(72) Inventors: Jan-Christian Becker, Niederndodeleben (DE); Thomas Schulz, Koenigslutter am Elm (DE); Christian Dittmer-Peters, Koenigslutter (DE); Markus Moebius, Welsleben (DE); Thomas Hagemeier, Magdeburg (DE)

(73) Assignee: Schuberth GmbH

(*) Notice: Subject to any disclaimer, the term of this patent is extended or adjusted under 35 U.S.C. 154(b) by 170 days.

(21) Appl. No.: 16/328,413

(22) PCT Filed: Aug. 23, 2017

(86) PCT No.: PCT/EP2017/071261
§ 371 (c)(1),
(2) Date: Feb. 26, 2019

(87) PCT Pub. No.: WO2018/037057
PCT Pub. Date: Mar. 1, 2018

(65) Prior Publication Data
US 2019/0191808 A1 Jun. 27, 2019

(30) Foreign Application Priority Data
Aug. 26, 2016 (DE) .................... 10 2016 115 897.6

(51) Int. Cl.
*A42B 3/04* (2006.01)
(52) U.S. Cl.
CPC ....... *A42B 3/0406* (2013.01); *H01M 2220/30* (2013.01)

(58) Field of Classification Search
CPC . H01M 2/1061; H01M 2220/30; Y02E 60/10; A42B 3/04; A42B 3/0413;
(Continued)

(56) References Cited

U.S. PATENT DOCUMENTS 3,422,224 A * 1/1969 Curran ................ A42B 3/0406
381/75
3,470,558 A 9/1969 Raschke
(Continued)

FOREIGN PATENT DOCUMENTS

CN 102791157 A 11/2012
CN 204949670 U 1/2016
(Continued)

OTHER PUBLICATIONS

Wikipedia, Wireless Personal Area Network, https://de.wikipedia.org/w/index.php?title=Wireless_Personal_Area_Network, printed Mar. 27, 2018, 4 pages.
(Continued)

*Primary Examiner* — Shaun R Hurley
*Assistant Examiner* — Bao-Thieu L Nguyen
(74) *Attorney, Agent, or Firm* — McCarter & English, LLP

(57) ABSTRACT

The invention relates to a protective helmet, in particular a protective motorcycle helmet, comprising an outer shell (1) for distributing impact forces, a battery socket (2), which is firmly connected to the outer shell (1), for detachably accommodating a battery (3), and a line assembly (4), which is electrically connected to the battery socket (2), for supplying electricity by means of the accommodated battery (3) to an electric apparatus (5) which is mechanically coupled to the outer shell (1).

19 Claims, 3 Drawing Sheets

(58) Field of Classification Search
CPC ......... A42B 3/02; A42B 3/026; A42B 3/0433; A42B 3/044; A42B 3/0446
See application file for complete search history.

(56) References Cited

U.S. PATENT DOCUMENTS

| | | | |
|---|---|---|---|
| 3,582,951 A | 6/1971 | Altmayer | |
| 3,977,003 A | 8/1976 | Kershaw | |
| 4,077,007 A | 2/1978 | McKinney | |
| 4,109,105 A | 8/1978 | Von Statten, Jr. | |
| 4,130,803 A | 12/1978 | Thompson | |
| 4,357,711 A | 11/1982 | Drefko et al. | |
| 4,400,591 A | 8/1983 | Jennings et al. | |
| 4,719,462 A | 1/1988 | Hawkins | |
| 4,729,132 A | 3/1988 | Fierro | |
| 4,833,726 A | 5/1989 | Shinoda et al. | |
| 4,903,350 A | 2/1990 | Gentes et al. | |
| 5,119,505 A | 6/1992 | Tisseront et al. | |
| 5,136,657 A | 8/1992 | Hattori | |
| 5,142,700 A | 8/1992 | Reed | |
| 5,291,203 A * | 3/1994 | Schneck | G01S 7/022 342/20 |
| 5,357,409 A | 10/1994 | Glatt | |
| 5,438,702 A | 8/1995 | Jackson | |
| 5,448,780 A | 9/1995 | Gath | |
| 5,508,900 A * | 4/1996 | Norman | A42B 3/0406 2/422 |
| 5,615,410 A | 3/1997 | DeMars | |
| 5,683,831 A * | 11/1997 | Baril | G02B 27/0176 429/96 |
| 5,931,559 A * | 8/1999 | Pfaeffle | A42B 3/044 362/106 |
| 5,996,128 A | 12/1999 | Yanagihara | |
| 6,464,369 B1 * | 10/2002 | Vega | A42B 3/044 362/105 |
| 6,691,325 B1 | 2/2004 | Pelletier et al. | |
| 6,701,537 B1 | 3/2004 | Stamp | |
| 7,555,788 B2 | 7/2009 | Schimpf | |
| 7,901,104 B2 * | 3/2011 | McLean | A42B 3/044 362/106 |
| 8,009,229 B1 | 8/2011 | Peterson | |
| 8,245,326 B1 | 8/2012 | Tolve | |
| 8,667,617 B2 * | 3/2014 | Glezerman | A42B 3/30 2/410 |
| 9,247,779 B1 * | 2/2016 | Aloumanis | G08G 1/137 |
| 9,445,639 B1 * | 9/2016 | Aloumanis | G02B 27/017 |
| 9,456,649 B2 | 10/2016 | Basson | |
| 9,711,146 B1 | 7/2017 | Cronin | |
| 10,219,571 B1 * | 3/2019 | Aloumanis | H04N 7/181 |
| 10,383,384 B2 * | 8/2019 | Zhavoronkov | A42B 3/042 |
| 10,779,604 B2 | 9/2020 | Lebel et al. | |
| 2005/0017911 A1 | 1/2005 | Lee | |
| 2006/0232955 A1 * | 10/2006 | Labine | A42B 3/044 362/105 |
| 2006/0277664 A1 | 12/2006 | Akhtar et al. | |
| 2007/0220662 A1 | 9/2007 | Pierce | |
| 2007/0289044 A1 | 12/2007 | Ellis | |
| 2008/0068825 A1 * | 3/2008 | Harris | A42B 3/0406 362/105 |
| 2008/0130271 A1 * | 6/2008 | Harris | A42B 3/0406 362/105 |
| 2009/0064386 A1 * | 3/2009 | Rogers | A42B 3/125 2/6.6 |
| 2009/0158508 A1 | 6/2009 | Quaranta et al. | |
| 2010/0175172 A1 | 7/2010 | Dempsey et al. | |
| 2010/0287687 A1 | 11/2010 | Ho | |
| 2011/0302701 A1 | 12/2011 | Kuo | |
| 2012/0077438 A1 | 3/2012 | Jung | |
| 2012/0189153 A1 | 7/2012 | Kushnirov et al. | |
| 2013/0007949 A1 | 1/2013 | Kurs et al. | |
| 2013/0176183 A1 * | 7/2013 | Boni | H01Q 1/276 343/720 |
| 2013/0190052 A1 | 7/2013 | Lundell | |
| 2013/0305437 A1 | 11/2013 | Weller et al. | |
| 2014/0000013 A1 * | 1/2014 | Redpath | H05K 1/028 2/422 |
| 2014/0000014 A1 * | 1/2014 | Redpath | A42B 3/04 2/422 |
| 2014/0020159 A1 | 1/2014 | Teetzel et al. | |
| 2014/0109297 A1 * | 4/2014 | Lanez | A42B 3/04 2/411 |
| 2014/0189938 A1 | 7/2014 | Redpath et al. | |
| 2015/0038199 A1 | 2/2015 | Shirashi | |
| 2015/0223547 A1 | 8/2015 | Wibby | |
| 2015/0282549 A1 | 10/2015 | Lebel et al. | |
| 2016/0100649 A1 | 4/2016 | Glezerman et al. | |
| 2016/0106174 A1 | 4/2016 | Chung et al. | |
| 2016/0249700 A1 * | 9/2016 | Zhavoronkov | A42B 3/042 2/421 |
| 2017/0006955 A1 | 1/2017 | Dow, II et al. | |
| 2017/0052000 A1 | 2/2017 | White et al. | |
| 2017/0367433 A1 | 12/2017 | Frett | |
| 2018/0275928 A1 | 9/2018 | Boksteyn | |
| 2018/0289095 A1 * | 10/2018 | Catterson | H04B 1/385 |
| 2019/0269193 A1 | 9/2019 | Benyola | |
| 2019/0320753 A1 * | 10/2019 | Le | H04R 1/105 |
| 2019/0380417 A1 * | 12/2019 | Zhavoronkov | A42B 3/0406 |
| 2019/0387829 A1 | 12/2019 | Becker et al. | |
| 2020/0015537 A1 * | 1/2020 | Becker | A42B 3/30 |
| 2020/0037693 A1 | 2/2020 | Klimek et al. | |
| 2020/0305532 A1 | 10/2020 | Lange et al. | |

FOREIGN PATENT DOCUMENTS

| | | |
|---|---|---|
| CN | 205106513 U | 3/2016 |
| CN | 206043574 U | 3/2017 |
| DE | 3042159 A1 | 6/1982 |
| DE | 8226935 U1 | 2/1983 |
| DE | 29519601 U1 | 2/1996 |
| DE | 29906107 U1 | 7/1999 |
| DE | 29914563 U1 | 1/2000 |
| DE | 102005038893 A1 | 3/2006 |
| DE | 202011051831 U1 | 11/2011 |
| DE | 102015216835 A1 | 3/2017 |
| DE | 102016122937 A1 | 5/2018 |
| DE | 102017130373 A1 | 6/2019 |
| EP | 0412205 A1 | 2/1991 |
| EP | 1393643 A1 | 3/2004 |
| EP | 2183989 A1 | 5/2010 |
| FR | 2668901 A1 | 5/1992 |
| GB | 2059206 A | 4/1981 |
| JP | 2000038342 A | 11/2000 |
| JP | 2005060889 A | 3/2005 |
| WO | 2004032658 A1 | 4/2004 |
| WO | 2011129576 A2 | 10/2011 |
| WO | 2012006653 A1 | 1/2012 |
| WO | 2012017836 A1 | 2/2012 |
| WO | 2012148519 A1 | 11/2012 |
| WO | 2016001915 A1 | 1/2016 |
| WO | 2016022984 A1 | 2/2016 |

OTHER PUBLICATIONS

International Search Report for Application No. PCT/EP2017/071261, dated Dec. 5, 2017, 4 pages.
Written Opinion for Application No. PCT/EP2017/071261, dated Dec. 5, 2017, 7 pages.
Rajpurohit, A. "Fiber Reinforced Composites: Advances in Manufacturing Techniques.", Researchgate; https://www.researchgate.net/publication/279885386. (Year: 2014).

* cited by examiner

PROTECTIVE HELMET

CROSS-REFERENCE TO RELATED APPLICATIONS

This application is a national stage application of international application no. PCT/EP2017/071261 filed Aug. 23, 2017, entitled "Protective Helmet," claiming priority to German application no. DE 10 2016 115 897.6 filed Aug. 26, 2016, which are hereby expressly incorporated by reference as part of the present disclosure.

FIELD OF THE INVENTION

The present disclosure generally relates to a protective helmet, for example, a protective motorcycle helmet.

BACKGROUND

Modern protective helmets not only have mechanical devices and features such as a visor, a ventilation device and turbulators, but increasingly also additional electric apparatus, which are either fixedly provided on the protective helmet or can be fitted later.

The operation of such electric apparatus requires electrical energy, which may be provided by a battery, for example. Here and hereinafter, the term battery is supposed to be understood as denoting primary cells—i.e. non-rechargeable energy storage units—as well as secondary cells—i.e. rechargeable energy storage units. Such batteries have a storage capacity limited, in particular, by their size and weight. In this case, it is generally very laborious to replace the battery of an electric apparatus disposed on the protective helmet, and most frequently virtually impossible if the wearer of the protective helmet also wears motorcycling gloves.

SUMMARY

It is therefore an object to develop and improve a protective helmet in such a way that the use of batteries for electric apparatus on the protective helmet is made easier for the wearer of the protective helmet.

An option can be provided on the protective helmet itself for detachably accommodating a battery and operating an electric apparatus on the protective helmet with this accommodated battery. On the one hand, a replacement of the battery—e.g. after is discharged—without removing or manipulating the electric apparatus supplied by it is made possible in this manner. On the other hand, the accommodation of the battery may be configured in such a way that this replacement is very easy, and possible even when the wearer of the protective helmet wears motorcycling gloves. Another considerable advantage is that a correct and ecologically sound disposal of the battery is facilitated.

The protective helmet according to at least some embodiments, which is, for example, a protective motorcycle helmet, comprises an outer shell for distributing impact forces, a battery socket, which is firmly connected to the outer shell, for detachably accommodating a battery, and a line assembly, which is electrically connected to the battery socket, for supplying electricity by means of the accommodated battery to an electric apparatus which is mechanically coupled to the outer shell. In this case, the electric apparatus may be a constituent part of the protective helmet. The electric apparatus may also be separate from the protective helmet. The electric apparatus may be mechanically coupled to the outer shell in an optionally detachable or firm manner, wherein this coupling may be effected both directly as well as indirectly, i.e. indirectly by a device interposed between the electric apparatus and the outer shell. The line assembly may be one or several electrical conductors, wherein the line assembly may also include further active or passive electrical components.

At least some embodiments of the protective helmet are characterized in that the battery socket has a battery frame, which is disposed inside the outer shell, for positively accommodating the battery. In at least some such embodiments, this battery frame substantially consists of plastic. Here and hereinafter, the inner face of the outer shell is the concave side of the outer shell, and thus the side of the outer shell facing towards the head of the wearer of the protective helmet. The above positive fit when the battery is accommodated may exist in one, two or in more than two directions. Such a positive fit is suitable for fixing the battery in the battery frame. In at least some embodiments, the battery frame has a battery frame opening for inserting the battery into the battery frame.

Another embodiment of the protective helmet is characterized in that the battery frame is adjacent to a lower edge of the outer shell and that the battery frame opening is substantially disposed at the lower edge of the outer shell. Here and hereinafter, the directional indication "lower" refers to the protective helmet in the state of it being worn by a person. In at least some embodiments, the battery frame, starting at the battery frame opening, substantially extends along the outer shell, and in some such embodiments the battery is inserted into the battery frame substantially in a vertically upward direction. Here and hereinafter, too, the directional indication of the "vertical upward" direction refers to the protective helmet in the state of it being worn by a person. Such an assembly makes it possible to accommodate the battery under the outer shell of the protective helmet without excessively increasing the volume required by the protective helmet. This assembly also permits convenient access to the battery by the wearer of the protective helmet.

At least some embodiments of the protective helmet are characterized in that the protective helmet comprises a helmet trim, which is firmly connected to the outer shell, for at least partially covering a lower edge of the outer shell. This helmet trim may substantially be formed of plastic and prevent damage to the outer shell if the unused protective helmet drops to the floor, for example. In at least some embodiments, the helmet trim also serves for delimiting the protective helmet in a downward direction. Furthermore, the battery frame may be firmly and positively connected to the helmet trim. Such a helmet trim affords an option for attaching the battery frame that requires no work on the outer shell, e.g. by drilling processes.

Another embodiment of the protective helmet is characterized in that the battery frame opening is disposed laterally offset from a vertical central longitudinal plane of the protective helmet. The central longitudinal plane is described by a vector in the longitudinal direction of the protective helmet, which longitudinal direction is defined, here and hereinafter, as the viewing direction of a person wearing the protective helmet, and a vector in a vertical direction, which vertical direction is defined, in at least some embodiments, in accordance with the above "vertically upward" direction. Therefore, a lateral offset from this vertical central longitudinal plane is an offset perpendicular to the central longitudinal plane, and thus, in a horizontal transverse direction, with respect to the above viewing direction of a person wearing the protective helmet. According to at least some embodiments, it is provided that the battery frame opening is disposed substantially centrally between a maximally rearward and a maximally lateral position along the lower edge of the outer shell. This arrangement corresponds to a region of the lower edge situated diagonally offset in a rearward direction from an imaginary center of the protective helmet. The region is suitable for the person wearing the protective helmet to conveniently reach towards the protective helmet without limiting the visual field of the protective helmet.

According to at least some embodiments of the protective helmet, it is provided that the battery socket has a spring device for biasing the accommodated battery in the ejection direction and a locking assembly with a gripping device for positively retaining the accommodated battery in the battery frame. In this way, the battery is ejected at least partially and can then be gripped more easily, for example with gloves. Laboriously pulling out the battery can thus be dispensed with. In at least some embodiments, the locking assembly has a release device for releasing the gripping device and for ejecting the accommodated battery from the battery frame. The release device may be capable of being operated by pressing. In this way, both connecting the battery to the battery socket and removing the battery from the battery socket is possible by means of a push, so that, effectively, a so-called push-push system is created.

In principle, an electrical connection between the accommodated battery and the line assembly for supplying the electric apparatus with power by means of the accommodated battery can by established in any way. At least some embodiments of the protective helmet are characterized in that the battery socket has a pole assembly for electrically and detachably coupling the accommodated battery. In at least some such embodiments, this pole assembly is configured for providing an electrical connection between the accommodated battery and the line assembly for supplying the electric apparatus with power. The pole assembly in this case may have at least one power pole for transmitting electrical energy and at least one signal pole for communication with the accommodated battery. In at least some embodiments, the power pole serves for providing the above electrical connection. The above coupling of the pole assembly may be implemented in a contactless manner, e.g. inductively, as well as by means of contacting by the pole assembly or the power pole and/or the signal pole. Providing the signal pole makes it possible to both query the state of the battery as well as, optionally, design the charging behavior of the battery—which is explained in more detail below—to be more complex, which may mitigate or avoid the degradation of the battery due to the charging cycles, for example.

Another embodiment of the protective helmet is characterized in that the pole assembly is disposed on a wall of the battery frame that is located opposite to the battery frame opening.

According to at least some embodiments of the protective helmet, it is provided that the protective helmet has an inner layer accommodated by the outer shell for damping impact forces, and that the line assembly is at least partially disposed between the outer shell and the inner layer. Such a placement of the line assembly permits a comparatively flexible routing of the line assembly, in which the latter is also protected against damage at the same time.

At least some embodiments of the protective helmet are characterized in that the electric apparatus is a digital device for wireless communication. Further, in at least some embodiments, the digital device is a radio module for a Wireless Personal Area Network (WPAN), for example, a radio module for Bluetooth.

Another embodiment of the protective helmet is characterized in that the protective helmet has a device socket, which is coupled electrically to the line assembly and mechanically, e.g., firmly, to the outer shell, for coupling to the electric apparatus. This coupling to the electric apparatus may, in principle, be effected in a contactless manner or via mechanical contacting. In at least some embodiments, the device socket is configured for contacting the electric apparatus. In this way, a connection facility for the electric apparatus is also permanently provided in the protective helmet. The device socket may be configured for detachably accommodating the electric apparatus. This permits replacing not only the battery, but also the electric apparatus.

Several electric apparatus may also be supplied with electricity by means of the battery, such as via the line assembly. In this case, one or more electric apparatus may be contacted at the, optionally several, device sockets. However, one or more electric apparatus may be permanently disposed in and hard-wired to the protective helmet as well, so that no device socket in the above sense is necessary for them.

According to at least some embodiments of the protective helmet, it is provided that the device socket has a device frame, which is disposed inside the outer shell, for positively accommodating the electric apparatus. This positive fit when the electric apparatus is accommodated, which is suitable for fixing the electric apparatus in the device frame, may also exist in one, two or in more than two directions. According to at least some embodiments, this device frame substantially consists of plastic. Also in at least some embodiments, the device frame has a device frame opening for inserting the electric apparatus into the device frame.

At least some embodiments of the protective helmet are characterized in that the device frame is adjacent to a lower edge of the outer shell and that the device frame opening is substantially disposed at the lower edge of the outer shell. In at least some embodiments, the device frame, starting at the device frame opening, substantially extends along the outer shell, e.g., such that the electric apparatus is inserted into the device frame substantially in a vertically upward direction. This yields the advantages already described in connection with the corresponding configuration of the battery frame and the battery frame opening also for the arrangement of the electric apparatus. In at least some embodiments, the device frame is firmly and also positively connected to the helmet trim.

Another embodiment of the protective helmet is characterized in that the device frame opening is disposed laterally offset from a vertical central longitudinal plane of the protective helmet. In this case, the device frame opening may be disposed substantially in a manner mirrored across the central longitudinal plane, relative to the battery frame opening. In this way, the one-sided weight of the battery on the helmet is at least partially compensated by the mirror arrangement of the electric apparatus.

According to at least some embodiments of the protective helmet, it is provided that the protective helmet has a charging device for receiving electrical energy and for charging the accommodated battery with the received electrical energy. In this case, the device socket may have a charging pole and a charging contact, for receiving the electrical energy. This charging pole may also be configured for supplying the electric apparatus with electricity. The accommodated battery may be charged by means of the line assembly in at least some embodiments. Thus, the battery can be charged without having to be removed from the battery socket.

In at least some embodiments, the charging device has a USB apparatus (universal serial bus) for establishing a USB connection, such as for connecting a USB cable, and for the above reception of the electrical energy via the USB connection. In at least some embodiments, the USB apparatus is included in the device socket.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations, and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages will become apparent from the following description and with reference to the Figures, which are understood not to be limiting.

DETAILED DESCRIPTION

Figure 1:
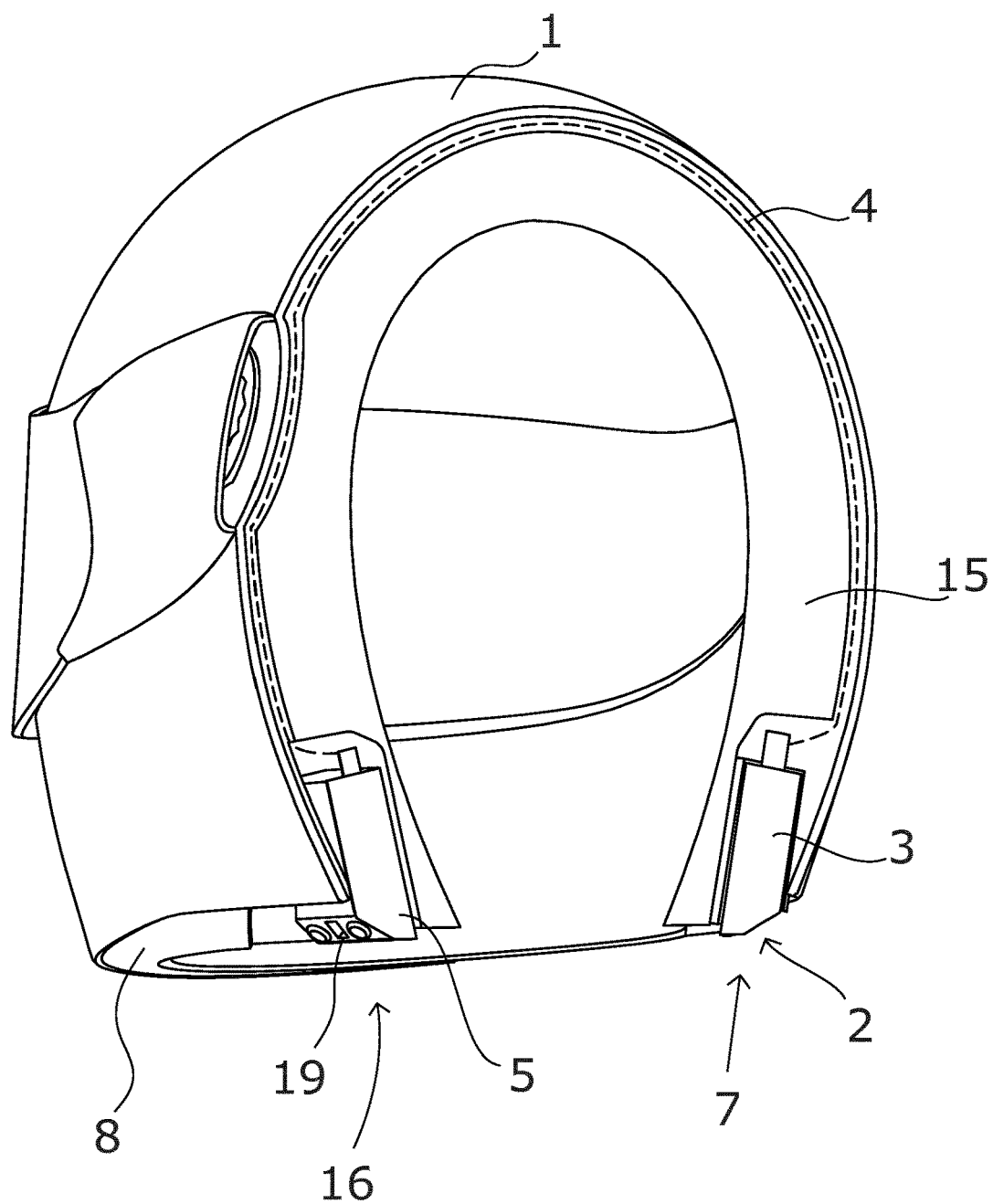
FIG. 1 is a schematic rear sectional view of a protective helmet.

The proposed protective helmet shown is a protective motorcycle helmet. It has an outer shell 1 for distributing impact forces. In the exemplary embodiment shown, the outer shell 1 consists of glass fibers with an added special resin. The battery socket 2, which is capable of detachably accommodating a battery 3, is firmly connected to the outer shell 1. A line assembly 4 is electrically connected to the battery socket 2 and serves for supplying an electric apparatus 5, which in the present case is a radio module for Bluetooth, with electricity from the battery 3. The electric apparatus 5 is mechanically coupled to the outer shell 1, which is explained in more detail below.

Figure 2:
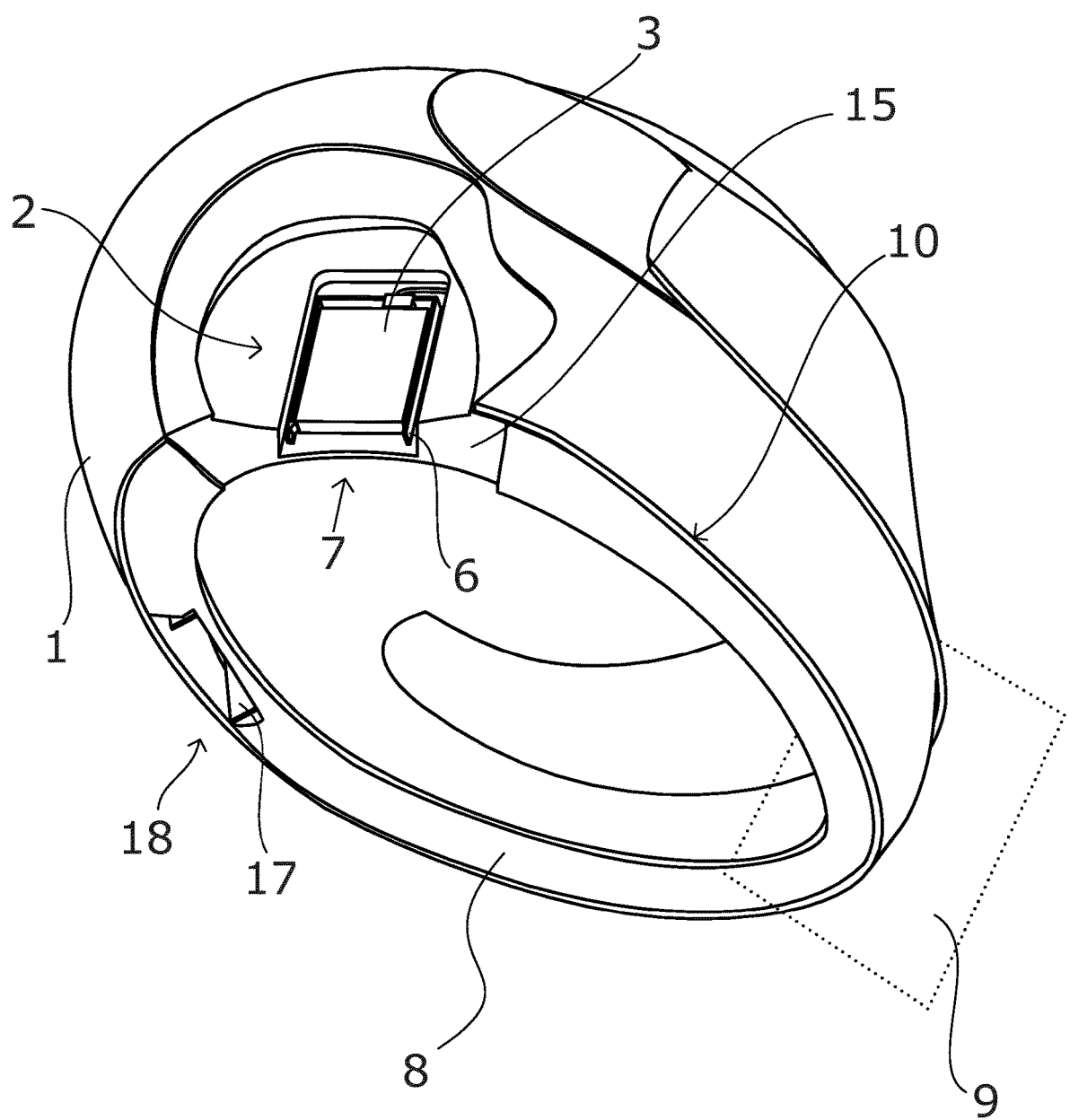
FIG. 2 is a schematic cross-sectional view of the protective helmet of FIG. 1, with a battery accommodated by the battery accommodating portion.
Figure 3:
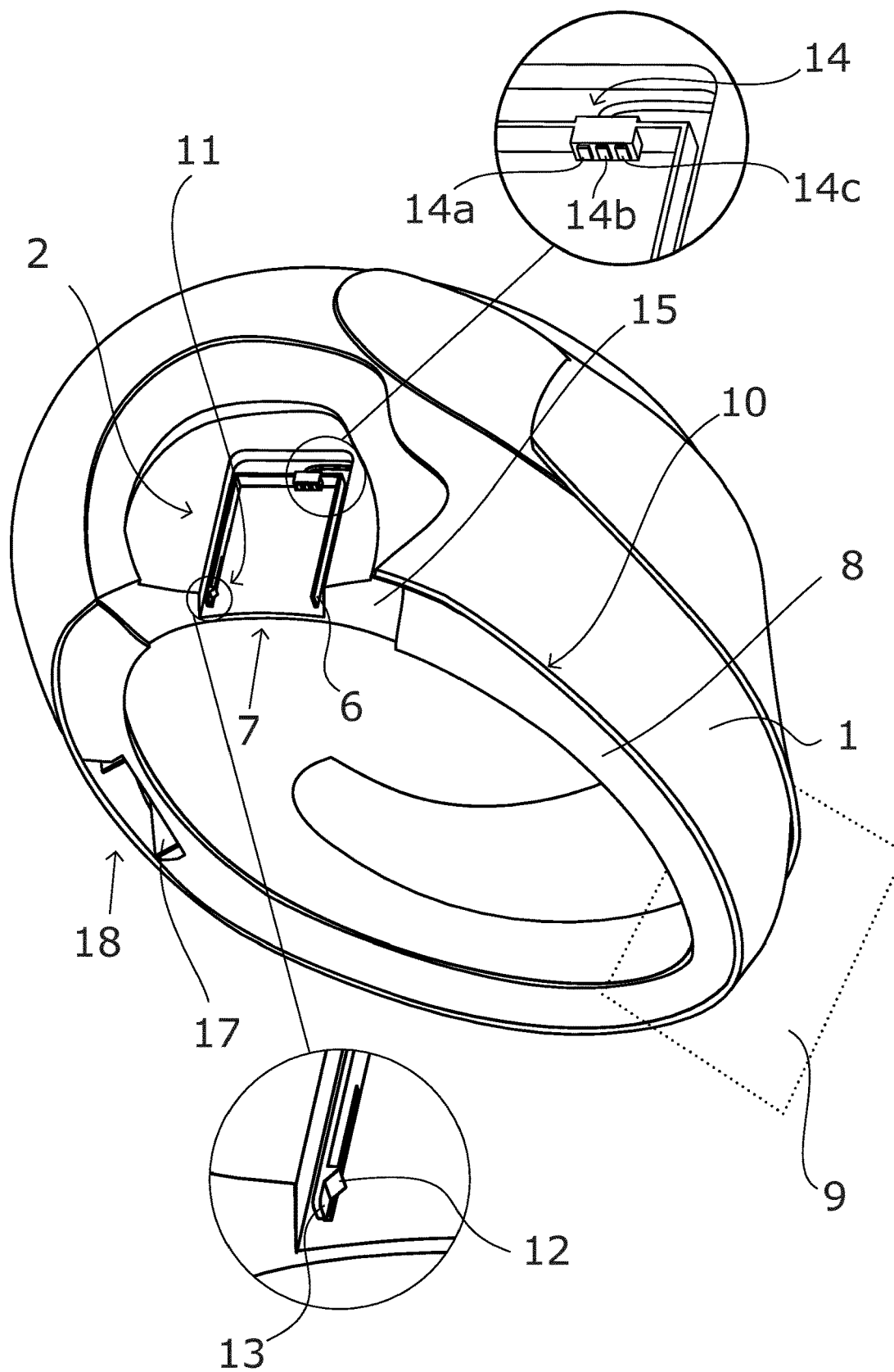
FIG. 3 is a schematic cross-sectional view of the protective helmet of FIG. 1, without the battery accommodated by the battery accommodating portion.

The plastic battery frame 6 of the battery socket 2 and the battery frame opening 7 for inserting the battery 3 into the battery frame 6 can be seen in both FIG. 2 and FIG. 3. In this case, a positive fit between the battery 3 and the battery frame 6 exists in the plane of the battery frame 6.

The protective helmet has a helmet trim 8, which also consists of plastic and covers the lower edge of the outer shell 1 and to which the battery frame 6 is firmly connected, in this case by a screw connection, for example, which is not shown here. In this case, the battery frame opening 7 also forms an opening of the helmet trim 8 and is oriented such that the battery 3 is inserted into the battery frame 6 in a vertically upward direction and along the outer shell 1. For convenient access, the assembly of the battery frame 6 and the battery frame opening 7 is in this case offset from the vertical central longitudinal plane 9 indicated in FIGS. 2 and 3, namely perpendicular thereto, about halfway to a maximally lateral position 10 along the lower edge of the outer shell 1.

As regards the mechanics of the battery frame 6 itself, it can be seen from FIG. 2 and, in particular, FIG. 3 that the battery socket 2 has a locking device 11—here integrally formed with the battery frame 6—which in turn includes a hook as a gripping device 12 and a contact surface as a release device 13. By actuating the contact surface by means of pressure, the hook is released from the engagement with the battery 3, so that the battery 3 is at least partially ejected from the battery frame by a spring device of the battery socket 2, which is not shown here.

FIG. 3 shows a pole assembly 14, which comprises a power pole 14a, a signal pole 14b and a ground pole 14c, and with which pole assembly 14 it is possible to both transmit power from the battery 3 and to communicate with a corresponding logic system of the battery 3.

As is apparent from FIG. 1, the line assembly 4 is disposed between the outer shell 1 and an inner layer 15 for damping impact forces. In the present exemplary embodiment, the inner layer consists of expanded polystyrene (EPS).

For coupling the electric apparatus 5 to the outer shell 1, the protective helmet has a device socket 16, which can be seen in FIG. 1 and which is capable of detachably accommodating the electric apparatus 5. The device socket 16 has a device frame 17, which in this case consists of plastic and is shown only in FIGS. 2 and 3, which is disposed inside the outer shell 1 and has a device frame opening 18 for inserting and removing the electric apparatus 5. Here, a contact device of the device socket 15 for electrically contacting the electric apparatus 5 is not separately shown. The device frame 17 is also connected to the helmet trim 8 by means of a screw connection. On the whole, the arrangement of the device frame 17 and the arrangement of the device frame opening 18 is substantially mirrored along the above vertical central longitudinal plane 9 with regard to the battery frame 6 and the battery frame opening 7, so that the same features and advantages substantially result also for the insertion of the electric apparatus 5 into the device frame 17.

Finally, FIG. 1 also shows a USB terminal 19 of the electric apparatus 5, which USB terminal is coupled to a USB apparatus of the device socket 16, which is not shown here and which is a USB socket, and which USB apparatus is included in a charging device of the protective helmet that is also not shown. Using this USB apparatus, a USB connection can be established by a USB cable being connected to the USB terminal 19 of the electric apparatus 5. Given a fitting connection of the USB cable, at the respectively other end, to a supply device, the battery 3 can then be charged by this supply device via the USB cable and then via the line assembly 4. If a USB cable is connected to the USB terminal 19 of the electric apparatus 5, the USB connection may be established, logically, only with the electric apparatus 5 and the electric apparatus 5 may then discharge this electrical energy to the charging device via a charging pole of the device socket 16.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. A protective helmet, comprising:
an outer shell configured for distributing impact forces,
a battery socket connected to the outer shell, configured for detachably receiving a battery, and
a line assembly electrically connected to the battery socket, configured for supplying electricity from a battery received in the battery socket to an electric apparatus mechanically coupled to the outer shell,
wherein the battery socket has a battery frame located inside the outer shell, and is configured for receiving a battery therein, wherein the battery frame defines a battery frame opening configured for insertion of such battery therethrough into the battery frame,
wherein the battery frame opening is laterally offset from a vertical central longitudinal plane of the protective helmet,
wherein the protective helmet has a device socket coupled mechanically to the outer shell, configured to be coupled with an electric apparatus, and coupled electrically to the line assembly for supplying electricity to the electric apparatus, and
wherein the device socket has a device frame located inside the outer shell, and is configured for receiving the electric apparatus therein, wherein the device frame defines a device frame opening configured for insertion of the electric apparatus therethrough and into the device frame,
wherein the device frame opening is laterally offset from the vertical central longitudinal plane of the protective helmet, and
wherein the device frame opening is located substantially symmetrically to the battery frame opening across and relative to the vertical central longitudinal plane.

2. The protective helmet according to claim 1, wherein the outer shell defines a lower edge, the battery frame is adjacent to the lower edge of the outer shell and the battery frame opening is substantially located at the lower edge of the outer shell.

3. The protective helmet according to claim 1, wherein the protective helmet comprises a helmet trim connected to the outer shell, and configured for at least partially covering a lower edge of the outer shell.

4. The protective helmet according to claim 1, wherein the battery socket has a spring device configured to bias a battery in the battery socket or battery frame in an ejection direction, and a locking assembly defining a gripping device configured to retain a battery in the battery frame.

5. The protective helmet according to claim 1, wherein the battery socket has a pole assembly configured to electrically and detachably couple with a battery received in the battery socket.

6. The protective helmet according to claim 5, wherein the pole assembly is located on a wall of a battery frame formed substantially of plastic that is located opposite to a battery frame opening, configured for inserting the battery into the battery frame, wherein the battery frame is located inside the outer shell and is configured for positively housing the battery.

7. The protective helmet according to claim 1, wherein the protective helmet has an inner layer located within the outer shell and configured for damping impact forces, and wherein the line assembly is at least partially located between the outer shell and the inner layer.

8. The protective helmet according to claim 1, wherein the electric apparatus defines a digital device for wireless communication.

9. The protective helmet according to claim 1, wherein the device frame is adjacent to a lower edge of the outer shell and the device frame opening is located at the lower edge of the outer shell.

10. The protective helmet according to claim 1, wherein the protective helmet has a charging device configured for receiving electrical energy and for charging a battery received in the battery socket with the received electrical energy.

11. The protective helmet according to claim 1, wherein the protective helmet is a protective motorcycle helmet.

12. The protective helmet according to claim 2, wherein the battery frame, starting at the battery frame opening, extends substantially along the outer shell.

13. The protective helmet according to claim 12, wherein the battery frame is configured to receive a battery in a substantially vertically upward direction.

14. The protective helmet according to claim 1, wherein the battery frame opening is located substantially centrally between a maximally rearward position and a maximally lateral position along a lower edge of the outer shell.

15. The protective helmet according to claim 3, wherein the helmet trim delimits the protective helmet in a downward direction.

16. The protective helmet according to claim 7, wherein the battery frame opening and/or device frame opening is arranged between the outer shell and the inner layer.

17. The protective helmet according to claim 1, wherein the battery frame opening and device frame opening are located adjacent a vertically lower edge of the outer shell.

18. The protective helmet according to claim 1, further including a signal connection communicatively connected to the line assembly and configured for signal communication with the battery socket.

19. The protective helmet according to claim 3, wherein the battery frame and/or the device frame is connected to the helmet trim.

\* \* \* \* \*